F. RIESENBERG.

SELF FILLING FOUNTAIN PEN.

APPLICATION FILED MAR. 28, 1918.

Reissued May 21, 1918.

14,474.

WITNESSES

Olive H. Holmes

B. J. Joffe

INVENTOR

FELIX REISENBERG

BY Munn & Co.

ATTORNEYS

UNITED STATES PATENT OFFICE.

FELIX RIESENBERG, OF NEW YORK, N. Y., ASSIGNOR, BY MESNE ASSIGNMENTS, TO HERBERT L. CARMAN, OF NEW YORK, N. Y.

SELF-FILLING FOUNTAIN-PEN.

14,474. Specification of Reissued Letters Patent. Reissued May 21, 1918.

Original No. 1,249,501, dated December 11, 1917, Serial No. 106,163, filed June 27, 1916. Application for reissue filed March 28, 1918. Serial No. 225,356.

*To all whom it may concern:*

Be it known that I, FELIX RIESENBERG, a citizen of the United States, residing in the city, county, and State of New York, have invented certain new and useful Improvements in Self-Filling Fountain-Pens, of which the following is a full specification.

My invention relates to fountain pen fillers of the type which comprises an elastic ink sack adapted to substantially fill the barrel of the pen, and means for compressing the sack to expel the air preparatory to inserting the nib end of the pen into an ink reservoir. According to my invention, as in most fillers of this type, the pressing means comprise a presser bar lying within the pen filled and adapted to be pressed against the sack by means which lie exposed in the wall of the pen.

In pens of this class it is necessary to provide against accidental movements of the sack compressing parts as otherwise ink may be inopportunely expelled. Many devices have been suggested for locking the operating parts in rest position but so far as I know the devices which are applicable to the type of pen herein described either employ springs or auxiliary locking devices requiring separate manipulation.

The object of my invention is to provide improved means for locking the operating parts in rest position without the employment of springs, the locking being effected simultaneously with the return of the operating parts to rest position.

An illustrative embodiment of my invention is shown in the accompanying drawings in which Figure 1 is a longitudinal sectional view of a fountain pen equipped with a filler according to my invention, the parts being shown in rest position.

Figure 1:
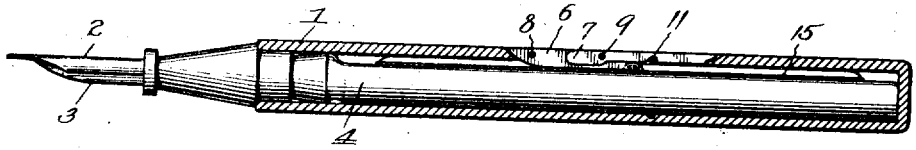

Referring more particularly to the drawings in which the reference numerals indicate the same or corresponding parts in all the figures,—1, 2, and 3 indicate respectively a pen barrel, nib and feed bar of usual construction and assembled in the ordinary manner. An ink sack 4 of rubber or other suitable elastic material is connected at its open end in the usual manner with the feed bar 3 and forms a reservoir for ink which is supplied as required to the nib 2. A presser bar 15 lies against the sack 4, the length and cross section of the bar being designed to effect, as nearly as possible, a complete evacuation of the air in the sack when the bar is pressed against it in the manner hereafter described. A lever 6, which may be called a transmission lever, is pivotally connected at 8 to the barrel 1 and lies in the longitudinal slot 5 of said barrel. At its lower end transmission lever 6 is connected with the presser bar 15 by means of pin 17, carried by transmission lever 6, and slotted flange 16 carried by presser bar 15. Operating lever 7 is pivotally connected to the barrel 1 at 9 and like transmission lever 6 lies within slot 5. The outer end 12 is under-cut and lies within the transverse groove or depression 13. The inner end of lever 7 lies upon transmission lever 6 intermediate the ends of the latter. As thus far described, the present device is substantially identical with that described and claimed in my copending application, filed November 29, 1915, Ser. No. 64055.

Figure 2:
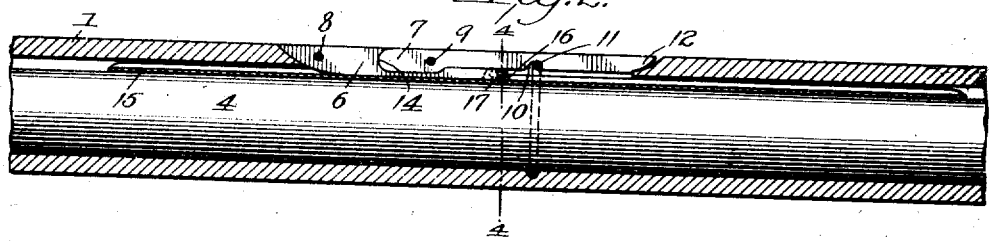
Fig. 2 is a longitudinal sectional view of the central portion of the pen on an enlarged scale, also showing the operating parts in rest position.
Figure 3:
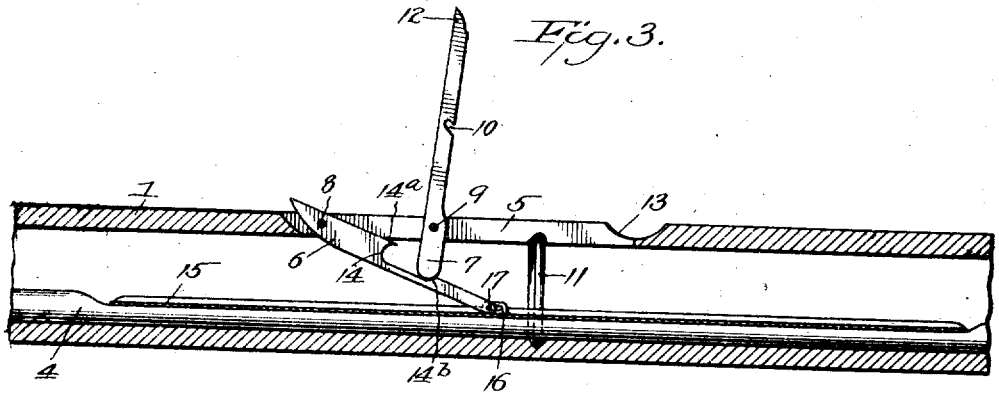
Fig. 3 is a view similar to Fig. 2 showing the operating parts in sack emptying position.
Figure 5:
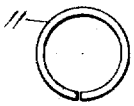
Fig. 5 is a detail view.
Figure 4:
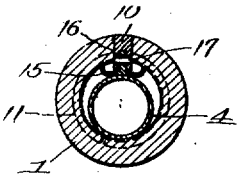
Fig. 4 is a transverse sectional view on the line IV—IV of Fig. 2.

Intermediate its ends the transmission lever 6 has adjacent its outer edge a recess 14 adapted to receive the inner end of operating lever 7. It will be noted that recess 14 is for the most part open, but has at one end an overhanging lip $14^a$. At its opposite end recess 14 terminates in an abutment $14^b$. The inner end of operating lever 7, is rounded and so dimensioned as to fit snugly in the recess 14 when the parts are in rest position (Figs. 1 and 2). On its under side the operating lever 7 has an oblique notch 10 inclined toward its outer end 12. On the inner surface of barrel 1 an annular groove is formed which is adapted to receive and hold split ring 11. As shown in Fig. 5, the ends of split ring 11 are slightly separated to permit it to be compressed sufficiently to be inserted in the barrel 1.

The functions of the parts and operation of the device are as follows: In rest position (Figs. 1 and 2) lever 7 is held within the slot 5 by reason of the engagement of notch 10 with ring 11. Transmission lever 6 is held against inward displacement by reason of the engagement of lip 14[a] with the end of lever 7. It will thus be seen that no movement of the operating parts can take place except at the will of the operator when it is desired to fill the pen with ink, and that the ink sack, when full, is wholly relieved from the weight of the operating parts. The filling operation is performed by inserting a finger nail under the end 12 of the lever 7 and raising it from slot 5. As the lever 7 approaches perpendicularity its inner end slides within recess 14 and depresses transmission lever 6 thus through presser bar 15 compressing the ink sack 4. A pin and slot connection between presser bar 15 and transmission lever 6 permits a slight alternative displacement of these parts and thus avoids longitudinal displacement of the presser bar. Operating lever 7 is held in perpendicular position by abutment 14[b] coacting with the acute angle between levers 7 and 6. With the parts in this position the pen nib is inserted in a reservoir of ink and the lever 7 is then snapped back into rest position permitting the sack 4 to expand under its own elastic influence and thus to draw in a charge of ink and at the same time to return presser bar and transmission lever 6 to rest position. The positions of the notch 10 and ring 11 with respect to each other are such that as lever 7 is returned to rest position, ring 11 will be slightly displaced to the left and will then spring back into place within the notch 10.

I do not consider that my invention is limited to the precise form of interengaging means shown here, nor, of course, to the particular snap-lock described. My invention in its broadest aspect embraces many obvious variations of the interlocking elements and the means for locking together levers 6 and 7 as they return to rest position in combination with any suitable device tending to hold lever 6 within the slot.

I claim:

1. In a device of the character described, the combination with a pen barrel having a longitudinal slot, of an ink sack, a presser plate operatively engaged with said sack, a transmitting lever pivotally mounted in said slot and operatively engaged with said presser plate, an operating lever pivotally mounted in said slot and having operative engagement with said transmitting lever, interlocking members carried respectively by said transmitting lever and said operating lever, said interlocking members engaging one another when the parts return to rest position, and means tending to hold said operating lever in rest position.

2. In a device of the character described, the combination with a pen barrel having a longitudinal slot, of an ink sack, a presser plate operatively engaged with said sack, a transmitting lever pivotally mounted in said slot and operatively engaged with said presser plate, an operating lever pivotally mounted in said slot and having operative engagement with said transmitting lever, interlocking members carried respectively by said transmitting lever and said operating lever, said interlocking members engaging one another when the parts return to rest position, and a snap-lock for holding said operating lever in rest position.

3. In a device of the character described, the combination with a pen barrel having a longitudinal slot, of an ink sack, a presser plate operatively engaged with said sack, a transmitting lever pivotally mounted in said slot and operatively engaged with said presser plate, an operating lever pivotally mounted in said slot and having its inner end in operative engagement with said transmission lever, and a recess adjacent the outer edge of said transmission lever and opened longitudinally, the said inner end of said operating lever moving into said recess when the parts return to rest position, substantially as and for the purpose described.

4. In a device of the character described, the combination with a pen barrel having a longitudinal slot, of an ink sack, a presser plate operatively engaged with said sack, a transmitting lever pivotally mounted in said slot and operatively engaged with said presser plate, an operating lever pivotally mounted in said slot and having operative engagement with said transmitting lever, interlocking members carried respectively by said transmitting lever and said operating lever, said interlocking members engaging one another when the parts return to rest position, and a snap-lock for holding said operating lever in rest position, said snap-lock comprising a ring concentrically disposed in the pen barrel and an oblique notch in the inner edge of said operating lever.

5. In a self-filling fountain-pen, a barrel having a slot, an operating lever pivotally mounted in said slot, said operating lever having a notch, and a yielding member in the slot adapted to be engaged by the notch of the lever for retaining the lever in the slot.

6. In a self-filling fountain-pen, a barrel having a slot and a groove in the barrel intercepted by the slot, an operating lever pivotally mounted in said slot, and an open ring in the groove presenting a portion of the ring across said slot, said operating lever having an oblique notch into which the open ring is adapted to snap when said lever is brought into the slot.

7. In a self-filling fountain-pen, a barrel having a slot and an inner groove intercepted by the slot, an operating lever pivotally mounted in said slot, and a ring in the groove, said operating lever having an oblique notch into which said ring is adapted to snap when the lever is brought into the groove.

8. In a self-filling fountain-pen, a barrel having a slot, an operating lever pivotally mounted in said slot, an ink sack in the barrel, a presser plate engaging the sack and in operative connection with the lever, said operating lever having an oblique notch, and a yielding member disposed transversely of the slot and adapted to be engaged by the notch in the lever for retaining the lever in the slot.

9. In a self-filling fountain-pen, a barrel having a slot and an inner groove intercepted by the slot, an operating lever pivotally mounted in said slot, and a ring in the groove, said ring being slightly narrower than the groove, said operating lever having an oblique notch into which said ring is adapted to snap when the lever is brought against the ring, so as to cause the same to yield in the groove to permit the ring to engage the notch of the lever and lock the lever in the slot.

FELIX RIESENBERG.